US009623492B2

(12) United States Patent
Capriotti et al.

(10) Patent No.: US 9,623,492 B2
(45) Date of Patent: Apr. 18, 2017

(54) MILLING TOOL FOR PORTION OF SLOT IN ROTOR

(71) Applicant: General Electric Company, Schenectady, NY (US)

(72) Inventors: Daryl Paul Capriotti, Simpsonville, SC (US); James Bradford Holmes, Fountain Inn, SC (US); Andrew Lee Trimmer, Niskayuna, NY (US)

(73) Assignee: General Electric Company, Schenectady, NY (US)

(*) Notice: Subject to any disclaimer, the term of this patent is extended or adjusted under 35 U.S.C. 154(b) by 94 days.

(21) Appl. No.: 14/671,293

(22) Filed: Mar. 27, 2015

(65) Prior Publication Data
US 2016/0279718 A1 Sep. 29, 2016

(51) Int. Cl.
B23C 3/28 (2006.01)
B23C 9/00 (2006.01)
(Continued)

(52) U.S. Cl.
CPC ............ B23C 3/28 (2013.01); B23C 9/00 (2013.01); B23C 2215/52 (2013.01);
(Continued)

(58) Field of Classification Search
CPC . Y10T 409/306216; Y10T 409/306272; Y10T 409/30644; Y10T 409/306664;
(Continued)

(56) References Cited

U.S. PATENT DOCUMENTS 4,100,388 A   7/1978  Meyer
4,256,555 A   3/1981  Wilson et al.
(Continued)

FOREIGN PATENT DOCUMENTS

CH   DE 102008000480 A1 *  9/2009   ............... B23C 3/30
DE        19938569 A1        4/2001
(Continued)

OTHER PUBLICATIONS

DE 10 2008 000 480 A1 Machine Translation, Aug. 29, 2016, pp. 6-11.*
(Continued)

Primary Examiner — Daniel Howell
Assistant Examiner — Nicole N Ramos
(74) Attorney, Agent, or Firm — Ernest G. Cusick; Hoffman Warnick LLC

(57) ABSTRACT

A milling tool is disclosed. The tool may include a base including a clamp for coupling to a selected mounting slot of a plurality of slots of the rotor; a milling tool including a motorized milling head; and a motorized linear actuator coupling the milling tool to the base. The base mounts the motorized linear actuator at an acute angle relative a portion of the slot to allow the motorized linear actuator to linearly move the milling tool to machine the portion of the slot. The portion of the slot may include, for example, an end face and, more particularly, a root corner of the slot where a cooling slot flange extends from the root of the slot. The milling tool may be portable.

22 Claims, 8 Drawing Sheets

(51) Int. Cl.
B23Q 9/02 (2006.01)
B23Q 9/00 (2006.01)

(52) U.S. Cl.
CPC ...... *B23C 2220/366* (2013.01); *B23Q 9/0007* (2013.01); *B23Q 9/02* (2013.01); *Y10T 409/304424* (2015.01); *Y10T 409/306216* (2015.01)

(58) Field of Classification Search
CPC ... Y10T 409/306776; Y10T 409/30756; Y10T 409/303752; Y10T 409/303808; Y10T 409/304144; Y10T 409/50082; Y10T 29/37; Y10T 29/49238; Y10T 29/49318; Y10T 29/4932; Y10T 29/49718; Y10T 29/49726; Y10T 29/49725; Y10T 29/49734; Y10T 29/49748; Y10T 29/5174; B23Q 9/0014; B23Q 9/0007; B23Q 9/02; B23Q 9/0042; B23Q 9/005; B23Q 5/00; B23Q 5/326; B23Q 2703/00; B23Q 2703/10; B23Q 2703/12; B23C 3/00; B23C 3/12; B23C 161/202215; B23C 161/04; B23C 161/44; B23P 6/002
See application file for complete search history.

(56) References Cited

U.S. PATENT DOCUMENTS

| | | | |
|---|---|---|---|
| 4,468,304 A | 8/1984 | Hill | |
| 4,761,104 A | 8/1988 | Hillestad | |
| 5,101,557 A * | 4/1992 | Mueller | B23B 47/28 29/889.21 |
| 5,149,405 A | 9/1992 | Bruns et al. | |
| 5,161,291 A * | 11/1992 | Guenther | B23C 3/00 29/56.5 |
| 5,284,406 A | 2/1994 | Mueller et al. | |
| 5,527,435 A | 6/1996 | Arnau | |
| 5,533,845 A | 7/1996 | Glover | |
| 6,290,461 B1 | 9/2001 | Wei et al. | |
| 6,296,172 B1 | 10/2001 | Miller | |
| 6,419,426 B1 | 7/2002 | Chalupa et al. | |
| 6,551,032 B1 | 4/2003 | Nolan et al. | |
| 6,652,369 B2 | 11/2003 | Jones et al. | |
| 6,767,168 B2 | 7/2004 | Miller | |
| 6,830,240 B2 | 12/2004 | Jones et al. | |
| 6,846,227 B2 | 1/2005 | Sato et al. | |
| 7,211,178 B2 | 5/2007 | Schreiber | |
| 7,309,215 B2 | 12/2007 | Negulescu | |
| 7,476,085 B2 | 1/2009 | Mohr et al. | |
| 7,699,685 B1 | 4/2010 | Gerstner | |
| 7,938,951 B2 | 5/2011 | Lee et al. | |
| 8,016,565 B2 | 9/2011 | Berg et al. | |
| 8,034,228 B2 | 10/2011 | Bayer et al. | |
| 8,151,458 B2 | 4/2012 | Hlavaty et al. | |
| 8,161,641 B2 | 4/2012 | Lamphere et al. | |
| 8,187,451 B2 | 5/2012 | Bayer et al. | |
| 8,262,897 B2 | 9/2012 | Bayer et al. | |
| 8,291,557 B2 | 10/2012 | Powers et al. | |
| 8,402,625 B2 | 3/2013 | Holmes et al. | |
| 8,540,861 B2 | 9/2013 | Bayer et al. | |
| 8,713,775 B2 | 5/2014 | Zhang et al. | |
| 8,778,147 B2 | 7/2014 | Wei et al. | |
| 2006/0156544 A1 | 7/2006 | Sherlock et al. | |
| 2007/0158389 A1 | 7/2007 | Rose | |
| 2008/0058982 A1* | 3/2008 | Gray | B25J 9/1602 700/159 |
| 2012/0269592 A1* | 10/2012 | Holmes | F01D 5/005 408/103 |
| 2013/0051947 A1* | 2/2013 | Holmes | B23B 41/00 408/103 |
| 2013/0167337 A1* | 7/2013 | Dupouy | B24B 9/04 29/23.51 |
| 2014/0034512 A1 | 2/2014 | Holmes et al. | |
| 2014/0034513 A1 | 2/2014 | Holmes et al. | |
| 2014/0223709 A1 | 8/2014 | Clark et al. | |

FOREIGN PATENT DOCUMENTS

| | | |
|---|---|---|
| GB | 2 442 449 A | 4/2008 |
| JP | S60-48216 A | 3/1985 |
| JP | H07-204935 A | 8/1995 |
| JP | H07266118 A | 10/1995 |

OTHER PUBLICATIONS

Extended European Search Report and Opinion issued in connection with related EP Application No. 16161973.9 dated Aug. 19, 2016.
U.S. Appl. No. 14/671,330, filed Mar. 27, 2015, Capriotti et al.
U.S. Appl. No. 14/671,365, filed Mar. 27, 2015, Capriotti et al.

* cited by examiner

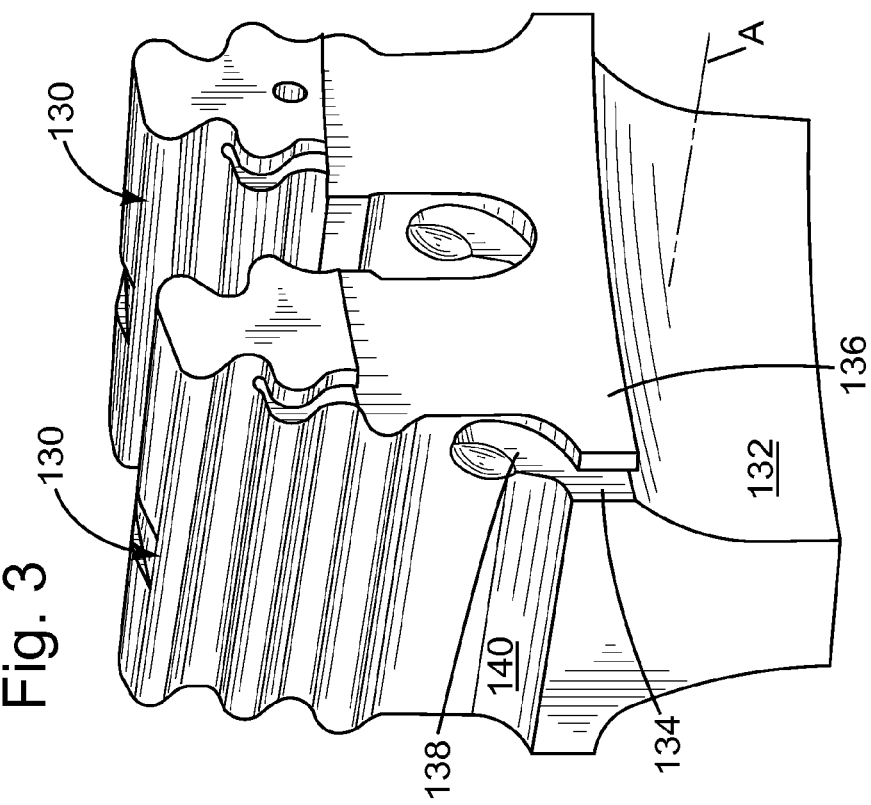
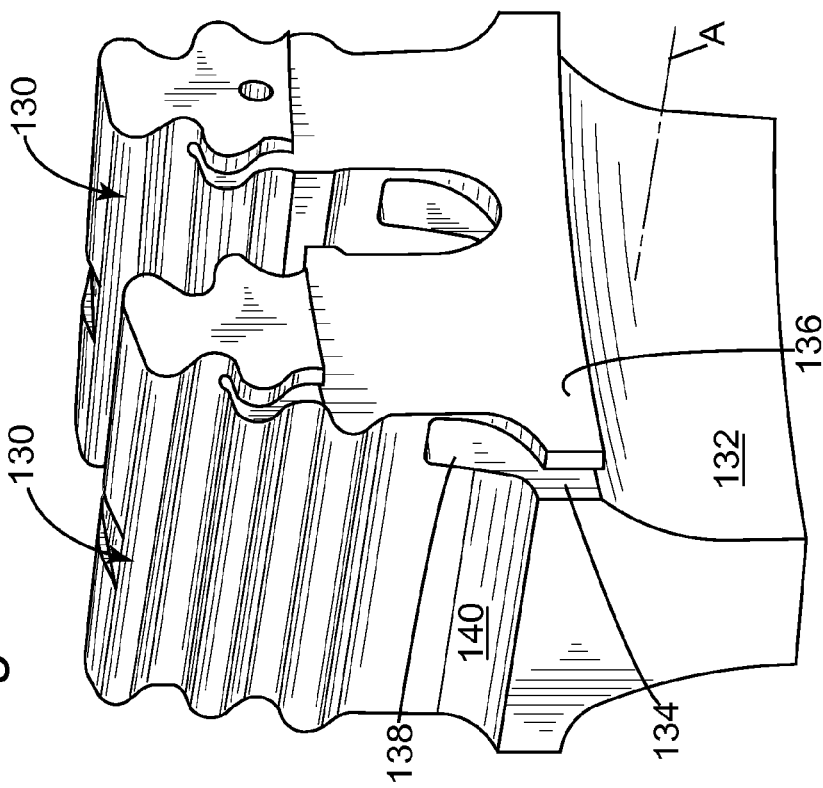

MILLING TOOL FOR PORTION OF SLOT IN ROTOR

BACKGROUND OF THE INVENTION

The disclosure relates generally to milling tools, and more particularly, to a milling tool for a portion of a slot in a rotor.

Large industrial machines include a wide variety of large, expensive parts that are stressed during operation. In order to reduce the costs of operating the industrial machines, it is advantageous to extend the lifespan of these parts for as long as safely possible. In order to extend the lifespan of parts, stress relief techniques may applied to create a less stress-inducing structure, e.g., with less sharp corners that may exhibit increased stress. Stress relief techniques may also be advantageous to apply to extend the lifespan of parts already in use in the field.

Turbines include a number of large blades that are coupled to a rotor using slots in the rotor, i.e., mating dovetail connections. During operation, the blades rotate with the rotor as a fluid is forced across the blades, or the blades are forcibly turned to move the fluid. During operation, the blade and rotor connections can be stressed. For example, an end face of the rotor slot, oftentimes a dovetail shape, may include a cooling channel flange that creates a cooling channel at the end face of the slot. A corner at which the flange integrally couples to the end face of the slot may observe high stresses. In order to provide safe operation due to the various stresses, a rotor wheel may be scrapped after, for example, 100,000 hours. Since replacement of a rotor wheel is extremely costly, whatever stress reducing techniques are possible to extend the lifespan of the disk are ideally implemented during manufacturing. However, in some instances, it is possible to apply stress-relieving revisions to a rotor in the field to provide additional stress reduction. Providing stress reducing techniques to rotors in the field, however, presents a number of challenges. For example, it is oftentimes very difficult to reach the structure, such as the afore-described corner of the flange at the end face of the slot. Another challenge is that the revisions that typically need to be completed require precision machining, which is difficult to provide in the field. A further challenge is that where a large number of structures require attention, e.g., 92 blade mounting slots may exist on a turbine rotor, the time requirement and the inherent costs to provide the stress relief techniques to the entire structure can be very high.

BRIEF DESCRIPTION OF THE INVENTION

A first aspect of the disclosure provides a milling tool for a slot in a rotor, the tool comprising: a base including a clamp for coupling to a selected mounting slot of a plurality of slots of the rotor; a milling tool including a motorized milling head; and a motorized linear actuator coupling the milling tool to the base, wherein the base mounts the motorized linear actuator at an acute angle relative an end face of the slot to allow the motorized linear actuator to linearly move the milling tool to machine a portion of the slot.

A second aspect of the disclosure provides a milling tool for a slot of a rotor, the tool comprising: a base including a clamp configured to mount in a selected mounting slot of a plurality of slots of the rotor, each slot including an end face and a cooling slot flange extending from a root corner of the slot; a milling tool including a motorized milling head; and a motorized linear actuator coupling the milling tool to the base, wherein the base mounts the motorized linear actuator at an acute angle relative the root corner of the slot to allow the motorized linear actuator to linearly move the milling tool to machine the root corner of the slot.

The illustrative aspects of the present disclosure are configured to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 2 shows an end perspective view of a rotor slot prior to machining with a milling tool according to embodiments of the invention.

FIG. 3 shows an end perspective view of the rotor slot of FIG. 1 after machining.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

Figure 1:
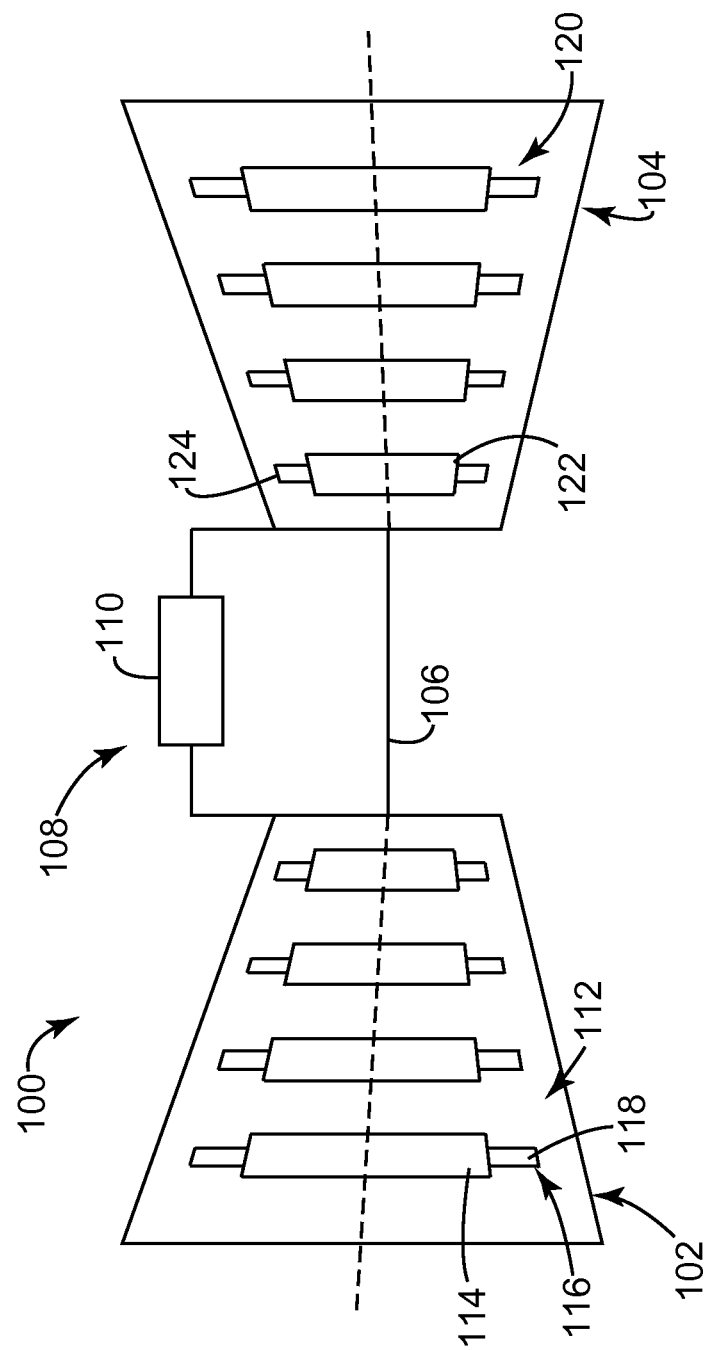
FIG. 1 shows a schematic view of a turbomachine.

As indicated above, the disclosure provides a milling tool for a portion of a slot in a rotor of a turbomachine. In one embodiment, the milling tool may be portable and easily transported from one location to another. FIG. 1 shows a turbomachine 100 that includes a compressor portion 102 operatively coupled to a turbine portion 104 through a common compressor/turbine shaft 106. Compressor portion 102 is also fluidically connected to turbine portion 104 through a combustor assembly 108. Combustor assembly 108 includes one or more combustors 110. Combustors 110 may be mounted to turbomachine 100 in a wide range of configurations including, but not limited to, being arranged in a can-annular array. Compressor portion 102 includes a plurality of compressor rotor wheels 112. Rotor wheels 112 include a first stage compressor rotor wheel 114 having a plurality of first stage compressor rotor blades 116 each having an associated airfoil portion 118. Similarly, turbine portion 104 includes a plurality of turbine rotor wheels 120 including a first stage turbine wheel 122 having a plurality of first stage turbine rotor blades 124. In accordance with an exemplary embodiment, a milling tool 200 (FIGS. 4, 5 and 8) may be provided for mounting to, for example, first stage turbine rotor wheel 122 or a first stage compressor wheel 114. It will be understood, however, milling tool 200 may be positioned to machine any rotor wheel of turbomachine 100.

Referring to FIGS. 2 and 3, a pair of slots 130 in a rotor 132 amongst a plurality of slots in the rotor is illustrated. Slots 130 may be located in any wheel of turbomachine 100. As understood, slots 130 are circumferentially spaced about a wheel or disk. Each slot 130 may take the form of any blade-to-rotor mounting element now known or later developed. In the examples illustrated, slot 130 includes a complex dovetail configuration; however, simpler arrangements are possible. For example, slots 130 may have substantially triangular cross-sections. Each slot 130 in rotor 132 includes an end face 134 facing axially along rotor 132 (see axis A), and a cooling slot flange 136 extending from a root corner 138 of the slot. "Root corner" is so termed because it is located in a root section 110 of the dovetail slot. FIG. 2 shows root corner 138 prior to milling as described herein. As illustrated, root corner 138 is relatively square and thus may observe a high level of stress. In FIG. 3, root corner 138 has been milled and thus has a more rounded out, stress-reduced configuration. As will be described herein, milling tool 200 (FIGS. 4, 5 and 8) may be employed to relieve stress in root corner 138 (FIG. 1) of slots 132 in, for example, first stage compressor rotor wheel 122 (FIG. 1). More specifically, milling tool 200 facilitates in field or in situ removal and repair of a high stress, portion, such as root corners 138, in slots 132. Although the teachings of the invention will be described relative to the particular setting of revising root corners 138, it is emphasized that milling tool 200 and the teachings of the invention may be employed for a large number of other portions of slots 130 and rotor 132. For example, other portions of slot 130 may include portions of the dovetail, a root portion of the dovetail, etc.

Figure 4:
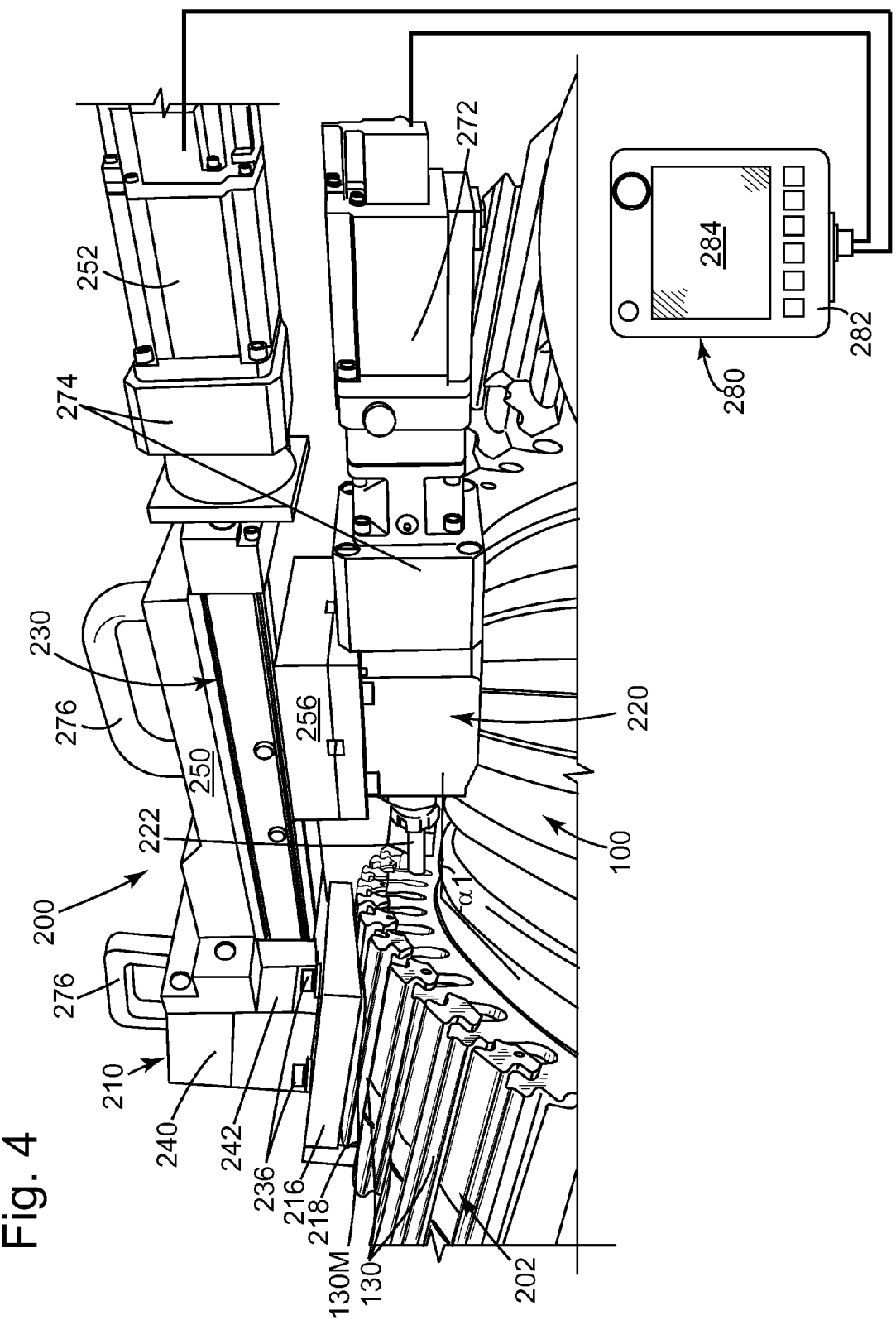
FIG. 4 shows a rear perspective view of a milling tool in an operative position on a turbomachine according to embodiments of the invention.
Figure 5:
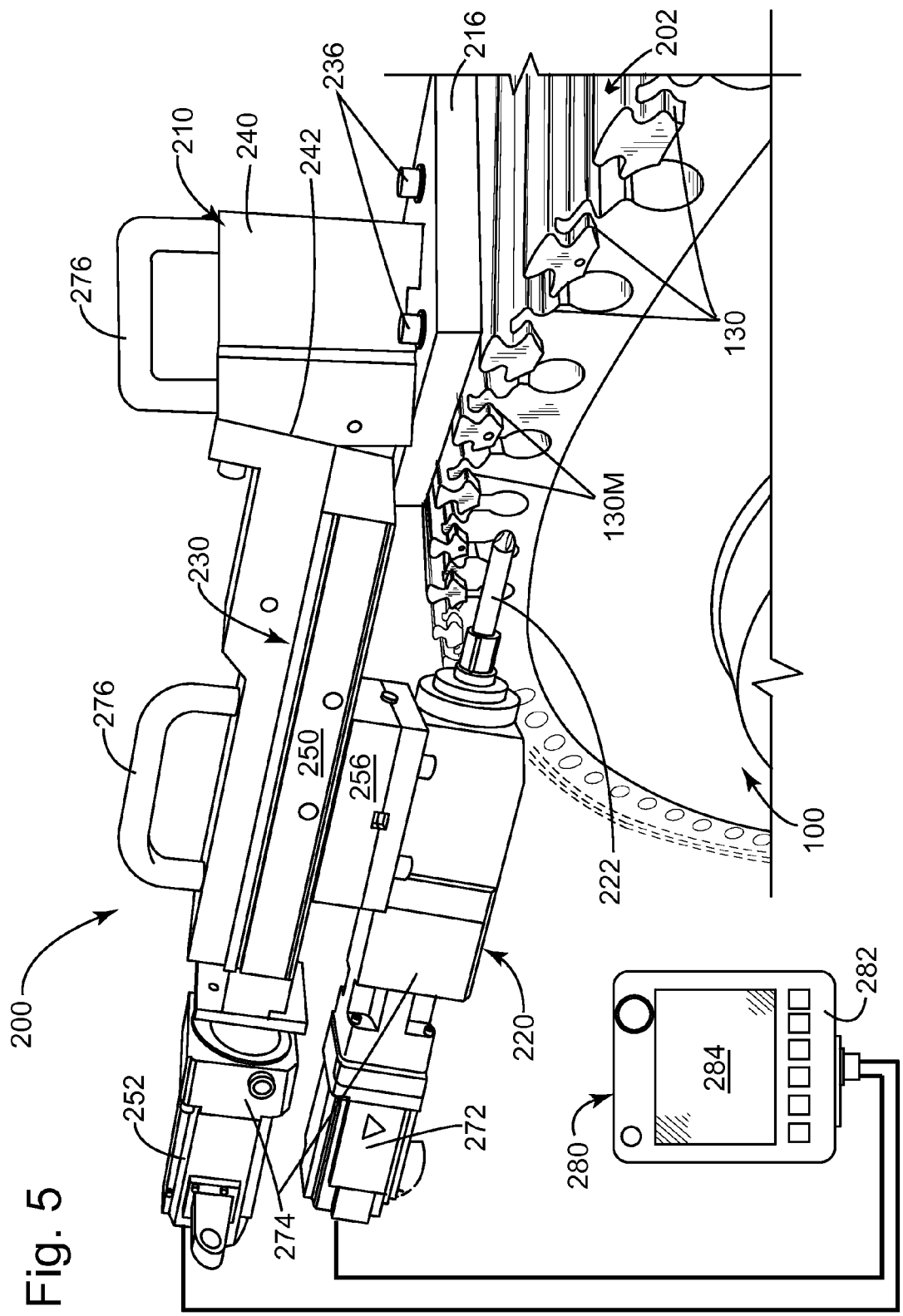
FIG. 5 shows a front perspective view of a milling tool in an operative position on a turbomachine according to embodiments of the invention.

Referring to FIGS. 4-5, milling tool 200 is illustrated mounted to a turbomachine rotor 202, i.e., a rotor wheel or disk of the rotor, having a plurality of slots 130 therein. FIG. 4 shows a rear perspective view and FIG. 5 shows a front perspective view. As illustrated, rotor 202 is still positioned within turbomachine 100. That is, milling tool 200 is mounted to turbomachine 100 in-situ and without having rotor 202 removed. In this fashion, milling tool 200 can function to repair rotor 202 without the time and expense of removing and/or transporting rotor 202. As illustrated, rotor 202 has any surrounding nozzles, casings, etc., removed and has also had its blades removed. Consequently, rotor 202 is exposed and readily accessible for repair work in-situ.

Milling tool 200 generally includes a base 210 for coupling the tool to rotor 202 including a clamp 212 (FIG. 6) for coupling to a selected mounting slot of a plurality of slots of the rotor. Tool 200 may also include a milling tool 220 including a motorized milling head 222, and a motorized linear actuator 230 coupling milling tool 220 to base 210. As will be described, milling tool 200 is relatively light weight, e.g., approximately 9-18 kilograms, and can be readily moved from position to position on turbomachine 100, and between different turbomachines.

Figure 6:
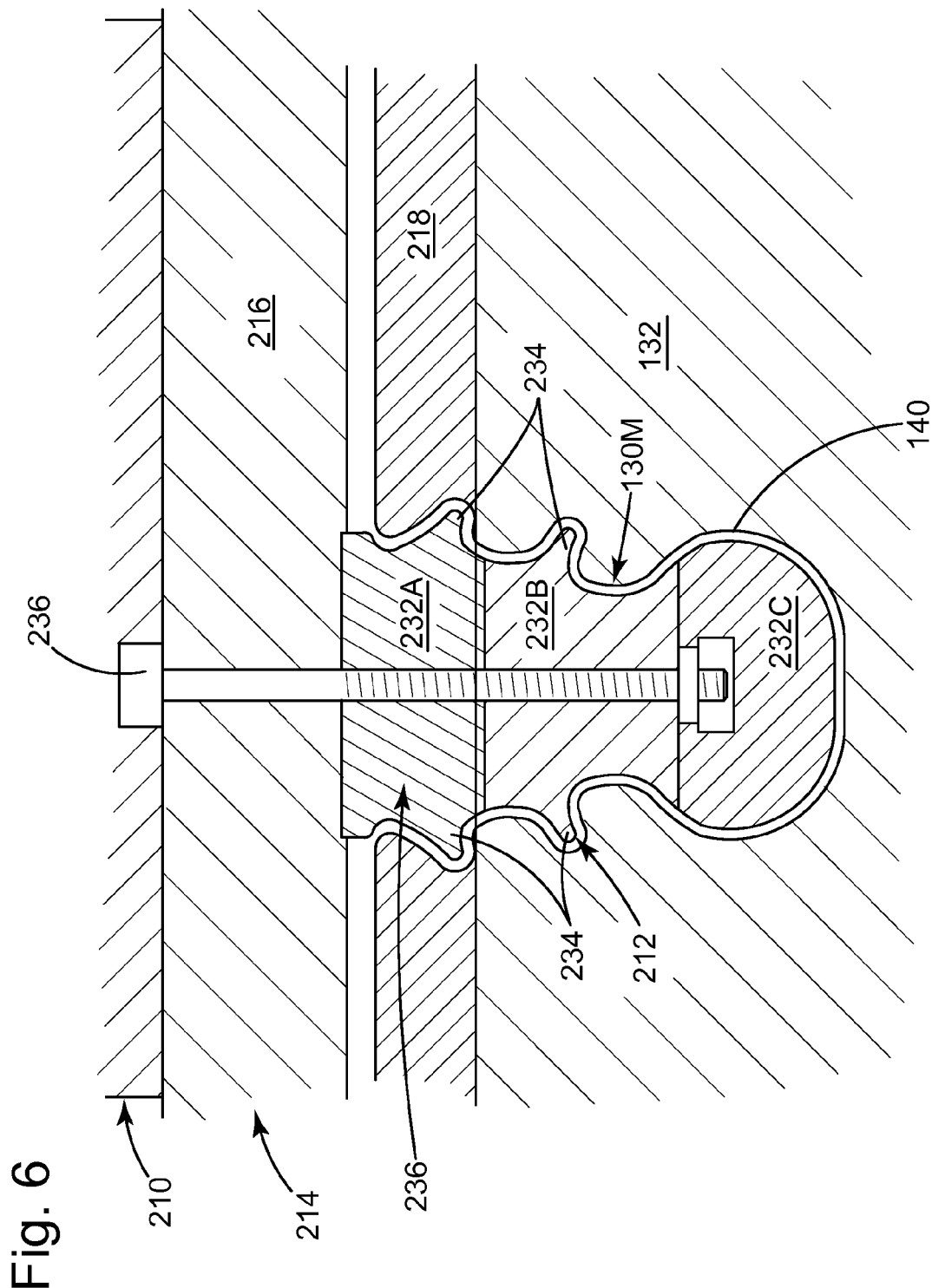
FIG. 6 shows an enlarged cross-sectional view of a clamp for positioning a base of the milling tool relative to a slot of a rotor.

Details of base 210 will now be described. FIG. 6 shows an enlarged cross-sectional view of a clamp 212 for positioning base 210 of the milling tool relative to a slot of a rotor. As shown in FIG. 6, base 210 may include clamp 212 for coupling to one or more selected mounting slots 130M of a plurality of slots of rotor 202. (Clamp(s) 212 is hidden in the perspective views of FIGS. 4 and 5 within the mounting slot(s) 130M.) As also shown in FIG. 6, base 210 may also include a clamp positioning member 214 for positioning clamp 212. As illustrated in FIGS. 4, 5 and 6, in one embodiment, clamp positioning member 214 may include a plate member 216 having sufficient strength to hold tool 200 in place during operation of milling head 222. It is understood, however, that clamp positioning member 214 may not be in the form of a plate and can include, for example, curved lower surface, a bent plate, etc. As shown best in FIG. 6, each clamp 212 is coupled to clamp positioning member 214 such that the clamp extends beneath clamp positioning member 214 for engagement with a selected mounting slot 130M of rotor 202. Clamp 212 may be coupled to plate member 216 in any fashion, e.g., welding, bolting or other fasteners, etc. Clamp positioning member 214 may also include a stop 218 (FIGS. 4 and 6) extending vertically from, for example, plate member 216 for axially positioning base 210 relative to slot 130M as clamp 212 is slidably positioned in the slot. That is, stop 218 abuts a forward end of slot 130 (left side of slot in FIG. 4) as clamp 212 is slid into mounting slot 130M to position base 210 relative to mounting slot 130M.

Clamp 212 may include any adjustable member capable of selectively securing itself and thus base 210 within a selected mounting slot 130M (FIGS. 5 and 6) in rotor 202. In one embodiment, clamp 212 may include an adjustable fastener 236 to allow selective securing and removal of the clamp in the selected mounting slot 130 of the plurality of slots of the rotor. As shown in FIG. 6, in one embodiment, clamp 212 may include an adjustable fastener 236 and a set of adjustable clamping members 232A-C collectively having a cross-sectional shape to approximately conform with at least a portion of mounting slot 130M. That is, an outer perimeter of members 232A-C may approximately conform to the interior surface of mounting slot 130M so that when the clamp is axially slid into slot 130, at least a portion of the clamp engages with the interior surface of mounting slot 130M to hold base 210 in position relative to mounting slot 130M. In the example shown, mounting slot 130M has a dovetail configuration, and accordingly, members 232A-C collectively have a dovetail configuration. Clamp 212 may additionally include, for example, one or more projections 234 that engage with the interior surface of slot 130 when members 232A-C are tightened together with adjustable fastener 236, e.g., a set screw with bolt seated within a lowermost member 232C. Rotation of adjustable fastener 236 may force the one or more projections 234 against an inclined surface(s) (adjacent projections 234) inside mounting slot 130M to engage projections 234 therewith, thus binding clamp 212 to slot 130 and preventing milling tool 200 from inadvertently moving during operation thereof. Additional suitable structures for clamping base 210 to mounting slot 130M may include, for example, a vice, spanner, jack, or other equivalent mechanical device connected to clamp positioning member 214, e.g., plate member 216 and/or stop 218.

With regard to mounting slot 130M to which base 210 is mounted, the slot may be the slot upon which milling head 222 operates or another slot offset therefrom, e.g., an adjacent slot or a slot 2-3 slots away from the slot to be machined. In addition, it is emphasized that while one clamp 212 has been illustrated in FIG. 6, a number of clamps 212 may be employed. For example, as shown in FIGS. 4 and 5, two or more clamps 212 may be axially employed within each mounting slot 130M used, each with their own adjustable fastener 236. Alternatively, each clamp 212 may include a number of adjustable fasteners 236 axially displaced to provide binding along a length of the clamp. In another example, as observed by comparing FIGS. 4 and 5, two or more clamps 212 may be spaced on plate member 216 so they may be mounted in different mounting slots 130M that are circumferentially spaced on rotor 202.

Figure 7:
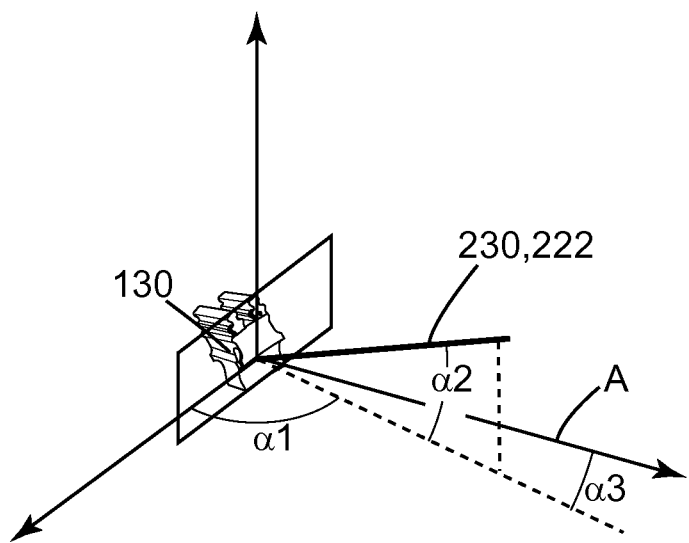
FIG. 7 shows a schematic grid of acute angle positioning of the milling tool of FIG. 4.
Figure 8:
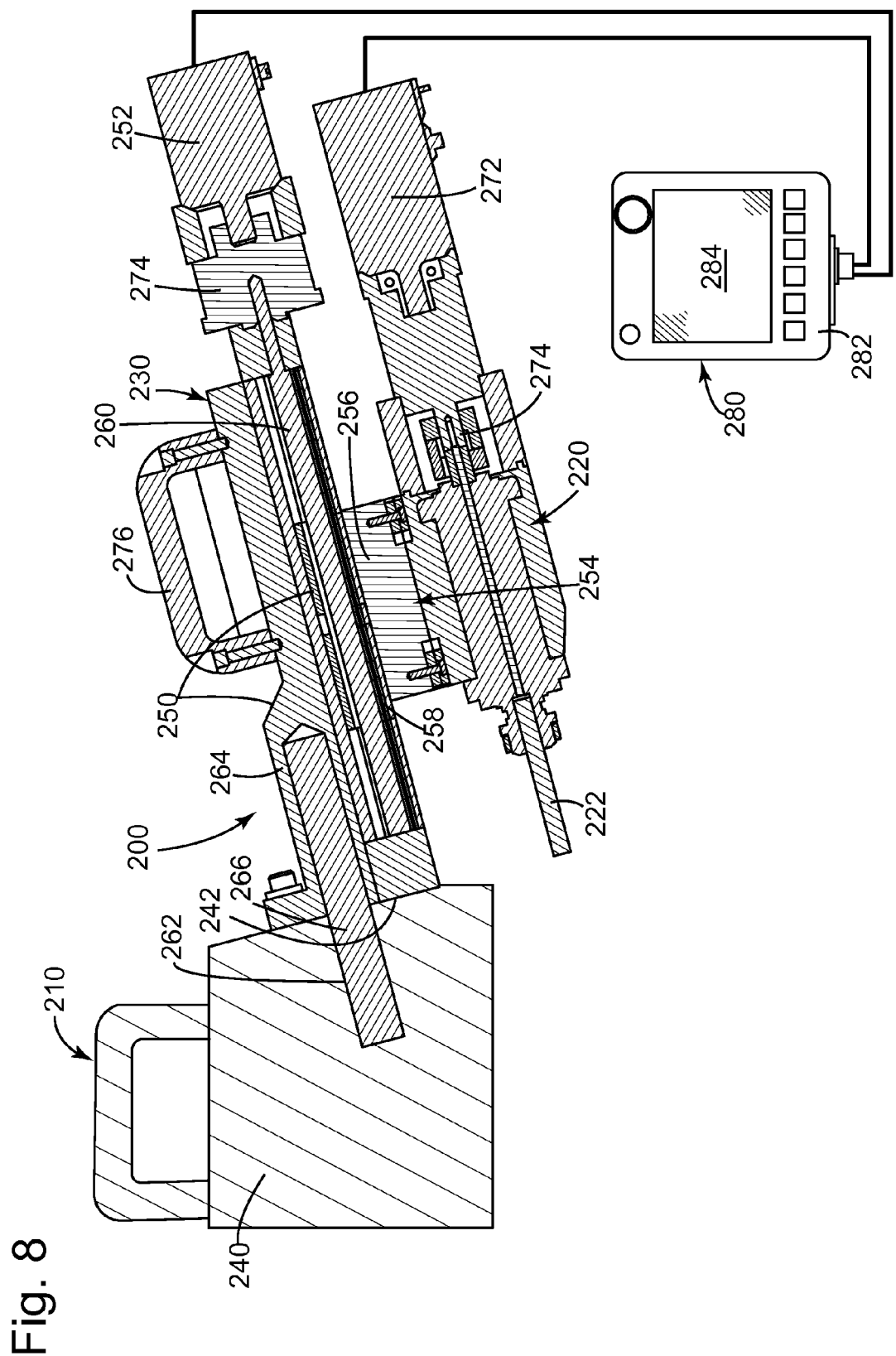
FIG. 8 shows a partial cross-sectional view of a milling tool according to embodiments of the invention.

Referring to FIGS. 4, 5 and 8, base 210 may also include a mount 240 for operatively coupling motorized linear actuator 230, and thus milling tool 220, to base 210. Mount 240 is fixedly coupled to clamp positioning member 214, e.g., plate member 216. As illustrated, mount 240 may include a structure capable of supporting milling tool 220 and motorized linear actuator 230 in a partially cantilevered fashion. In one embodiment, mount 240 may include a block of machined aluminum or other structural metal, e.g., steel, stainless steel, etc., coupled to clamp positioning member 216. Mount 240 defines a first acute angle ($\alpha$1) of motorized linear actuator 230, and thus milling head 222, relative to slot 130, and in particular, a portion of slot 130 to be machined such as end face 134 (FIGS. 2-3). In particular, mount 240 may include a mount surface 242 to which motorized linear actuator 230 is mounted such that milling head 222 can access, for example, end face 134 (FIGS. 2-3) of slot 130. That is, base 210 may mount motorized linear actuator 230 at a first acute angle ($\alpha$1) relative to a portion of slot 130, such as end face 134 and/or root corner 138 (FIGS. 2-3) thereof, to allow motorized linear actuator 230 to linearly move milling tool 220 to machine a portion of the slot, e.g., root corner 138. For the particular turbomachine 100 illustrated, the first acute angle ($\alpha$1) may be approximately 47° to 49°, and more particularly, approximately 48.8°. Referring to FIG. 7, a schematic diagram illustrating the details of the angular arrangement provided by mount 240 for motorized linear actuator 230 and milling head 222 is illustrated. As shown, linear actuator 230 and milling head 222 (which are substantially aligned) have first acute angle ($\alpha$1) relative to the desired portion of slot 130 (shown schematically by the parallelogram). Mount surface 242 may also be configured to position motorized linear actuator 230 (FIGS. 4-5) and milling head 222 at a second acute angle ($\alpha$2) relative to an axis A of turbomachine 100 and a third acute angle ($\alpha$3) relative to axis A of turbomachine 100. As illustrated, a second acute angle ($\alpha$2) is vertically disposed relative to axis A of turbomachine 100 and third acute angle ($\alpha$3) is horizontally disposed relative to axis A of turbomachine 100. In this manner, milling head 222 may be angularly positioned to access any available portion of slot 130 possible. Each turbomachine 100 may have specific acute angles ($\alpha$1, $\alpha$2, $\alpha$3) necessary to access a desired portion of slot 130. To accommodate the varied turbomachines 100, a number of mounts 240 with different mount surfaces 242 having different angular arrangements may be employed so that use of milling tool 200 with a wide variety of turbomachines 100 may be possible.

Referring to FIGS. 4, 5 and 8, details of motorized linear actuator 230 and milling tool 220 will now be described. As shown best in the cross-sectional view of FIG. 8, motorized linear actuator 230 may include a body 250 and a motor 252 coupled to body 250. Body 250 is mounted to mount 240 using any conventional couplings such as welds, bolts (shown), a slide engagement, etc. A milling tool slide mount 254 slidably couples milling tool 220 to body 250. Milling tool slide mount 254 may include a support member 256 having a slide member 258 capable of sliding engagement with body 250. Motorized linear actuator 250 may also include a ball screw 260 (also known as a worm gear) that operatively couples milling tool slide mount 254, by rotating engagement with slide member 258, and motor 252 to linearly move milling tool slide mount 254 and milling tool 220 relative to body 250. That is, motor 252 can be actuated to turn ball screw 260 and slidably position milling tool slide mount 254, via slide member 258, in any linear position desired along body 250. Motor 252 may be any form of motor, e.g., pneumatic, hydraulic, electric, capable of precisely positioning milling tool 220. Ball screw 260 may provide any necessary threading to accommodate the desired precision, i.e., threading on ball screw 260 can vary depending on the model and the sensitivities desired. In any event, ball screw 260 may provide positioning relative to the part being machined within thousandths of an inch (approximately 0.0254 millimeters). In one particular example, motorized linear actuator 230 is configured to advance milling head 222 approximately 0.125 inches (~3.175 mm) into root corner 138 (FIGS. 2-3).

Milling tool 220 may include any now known or later developed milling tool capable of machining a portion of slot 130. In the example shown, milling tool 220 includes a motor 272 operatively coupled to rotate milling head 222. Milling head 222 may include special flutes or cutting rake angles to reduce chatter, enhance flushing, or achieve specific geometries. Motor 272 may be any form of motor, e.g., pneumatic, hydraulic, electric, capable of providing the necessary torque and speed to milling head 222 to operate. Motor 272 is ideally the same type as motor 252 of linear actuator 230. As understood in the art, motors 252 and 272 may include any necessary transmissions 274 to accommodate operation of ball screws 260 and milling head 222, respectively.

As shown in FIG. 8, body 250 and base 210, and in particular, mount 240, may include mating alignment elements 262, 264 for aligning motorized milling head 222 at acute angle(s) $\alpha$1, $\alpha$2 and/or $\alpha$3 relative to axis A of turbomachine 100 (FIG. 4). In one embodiment, alignment elements 262, 264 may include openings for receiving an alignment pin 266. It is emphasized that a wide variety of other alignment mechanisms may be possible, e.g., aligned edges of mount 240 and body 250, fastener openings, etc.

Referring to FIGS. 4, 5 and 8, milling tool 200 may also include an automated control system 280 for controlling operation of motorized milling head 222, i.e., motor 272, and motorized linear actuator 230, i.e., motor 252. Automated control system 280, according to embodiments of the invention, includes a handheld controller 282 operatively coupled to motorized milling tool 220 and motorized linear actuator 230. Controller 282 may be operatively coupled to milling tool 220 and linear actuator 230 in any now known or later developed manner, e.g., wires (shown in FIGS. 4 and 9), through a wireless network (FIGS. 5 and 7), etc., such that tool 200 can be operated remotely, i.e., not immediately adjacent milling head 222. Controller 282 may include any form of user interface. For example, controller 282 may include a touchscreen 284 capable of providing a large variety of graphical user interfaces (GUIs) for controlling tool 200. Control system 280 may include any form of industrial programmable logic controller (PLC), and may also include any necessary power convertors, PLC logic, circuit breakers, emergency stops, cooling fan, etc.

Figure 9:
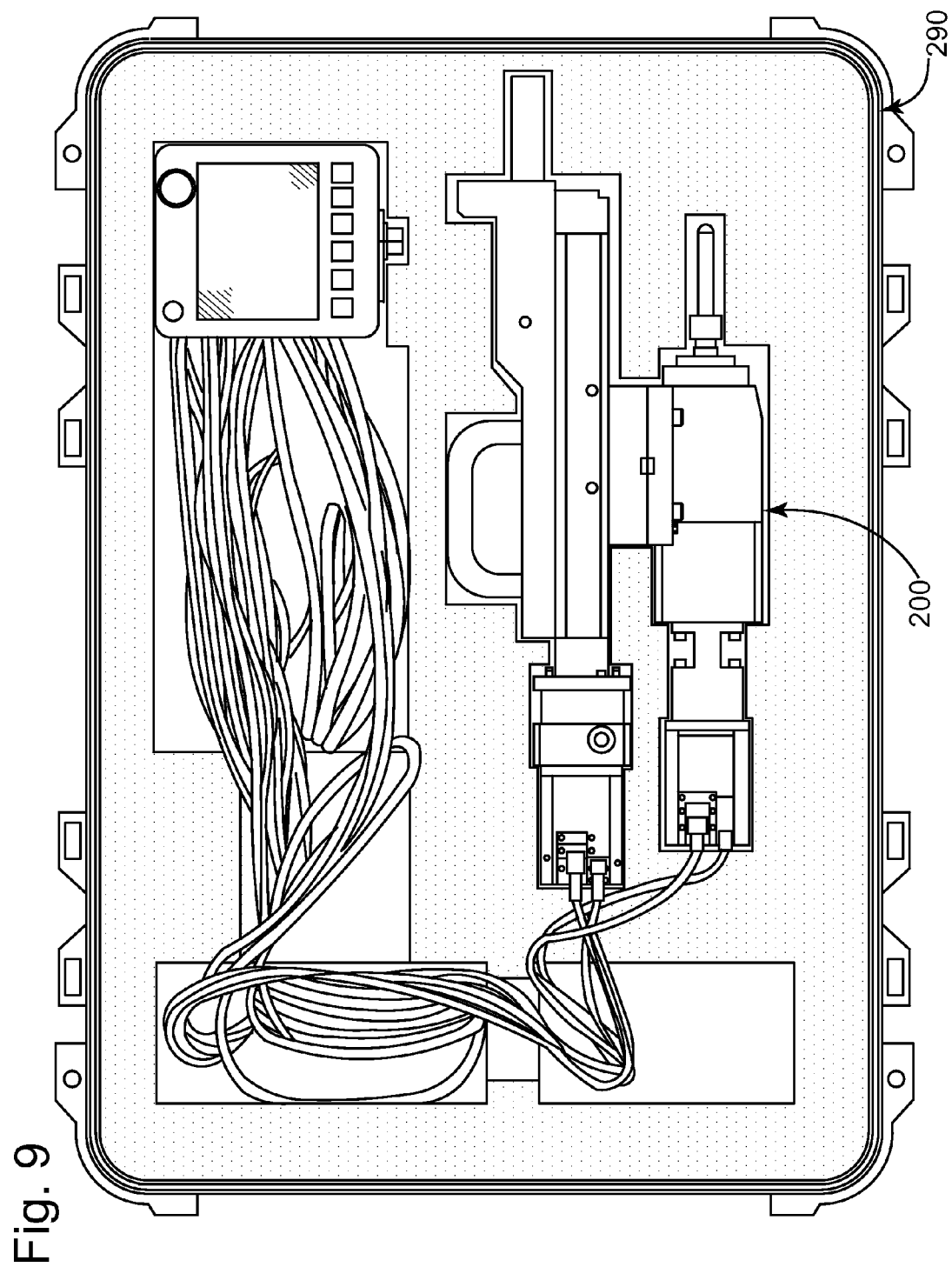
FIG. 9 shows a perspective view of the milling tool apart from a turbomachine.

Milling tool 200 is made out of a light weight material such as aluminum, except where stronger materials may be required, e.g., milling head 222, ball screw 260, etc. In order to allow for easy movement of portably milling tool 200, base 210 and/or motorized linear actuator 230 may include at least one handle 276 (FIGS. 4, 5 and 8). As shown in FIG. 9, milling tool 200 may be provided with a carrying case 290 for safe and easy transport between different turbomachine 100 locations.

In operation, as shown in FIGS. 4 and 5, milling tool 200 is carried to a turbomachine 100 location and mounted in a selected mounting slot(s) 130M. That is, base 210 is mounted by clamp(s) 212 being slid into selected mounting slot(s) 130M and tightened into place using adjustable fastener(s) 236. Handle 276 on base 210 can be used to assist in positioning. Motorized linear actuator 230 and thus milling tool 220 is then mounted to mount 240, perhaps using handle 276 thereon. Where necessary, as shown in FIG. 8, alignment elements 262, 264 may be employed including perhaps alignment pin 266, to position milling tool 220 and milling head 222 relative to the desired slot 130. Motorized linear actuator 230 may be coupled to mount 240 using, for example, bolts, as shown in FIGS. 4, 5 and 8. Milling tool 200 may be calibrated in any now known or later developed fashion, e.g., using a calibration rig, making actual positioning measurements and corrective positioning, etc. In most cases, milling tool 200 will have been previously configured to minimize the need for changes in positioning. However, if necessary, changes in positioning may be provided, for example, by changing mount 240, re-positioning of clamp(s) 212, etc.

Once properly positioned, power may then be supplied to tool 200, e.g., electric, hydraulic, etc., in a conventional manner depending on the power source for which tool 200 is configured. Milling tool 200 may then be powered on using automated control system 280 such that milling head 222 is operational. Motorized linear actuator 230 may then be activated to linearly move milling head 222 into contact with the desired portion of slot 130 to be machined. In the example shown in FIG. 3, the portion included root corner 138 of end face 134 of slot 130. Motorized linear actuator 230 may be configured to precisely advance milling head 222 the requisite amount into the portion of slot 130 at any desired depth and/or speed. In one example, as noted herein, motorized linear actuator 230 is configured to advance milling head 222 approximately 0.125 inches (~3.175 mm) into root corner 138 (FIGS. 2-3). Automated control system 280 functions to control operations of tool 200, and may be configured to allow for user selected operation configurations, e.g., a particular depth/speed for a particular turbomachine type, rotor size, etc. Once complete, motorized linear actuator 230 and milling tool 220 may be disconnected from base 210, i.e., mount 240, perhaps using handle 276. Base 210 may then be moved to a next mounting slot(s) 130M (FIGS. 4-5) for machining another slot's portion, and the above-described process may be repeated for other slots 130 of turbomachine 100. Milling head 222 may be replaced as necessary to maintain adequate precision.

Milling tool 200 provides an automated single axis mill with handheld control, perhaps with touchscreen functionality, for the precise and repeatable removal of material in a portion of a rotor slot. Tool 200 removes a precise amount of material in an automated fashion that greatly reduces the imprecision, time and costs of a manual process that is not capable of holding exact tolerances needed in the highest stressed area of, for example, a turbomachine hot gas path. Tool 200 may be fully portable and may be adapted for electric 110V operation for use on a turbomachine deck during an outage. Milling tool 200 precision allows later electro-chemical machining (ECM) processes to be accomplished in the field to radius the portion of the slot and produce final surface finish.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A milling tool apparatus for a slot in a rotor, the milling tool apparatus comprising:
    a base including a clamp for coupling to a selected mounting slot of a plurality of slots of the rotor;
    a milling tool including a motorized milling head; and
    a motorized linear actuator coupling the milling tool to the base,
    wherein the base mounts the motorized linear actuator at an acute angle relative to an end face of the slot to allow the motorized linear actuator to linearly move the milling tool to machine a portion of the slot,
    wherein the clamp is configured to hold the base in position relative to the selected mounting slot.

2. The milling tool apparatus of claim 1, wherein the base and the motorized linear actuator include at least one handle.

3. The milling tool apparatus of claim 1, further comprising an automated control system for controlling operation of the motorized milling head and the motorized linear actuator.

4. The milling tool apparatus of claim 3, wherein the automated control system includes a handheld controller operatively coupled to the milling tool and the motorized linear actuator.

5. The milling tool apparatus of claim 4, wherein the handheld controller includes a touchscreen.

6. The milling tool apparatus of claim 1, wherein the motorized linear actuator includes:
    a body;
    a motor coupled to the body;
    a milling tool slide mount slidably coupling the milling tool to the body; and
    a ball screw operatively coupled to the milling tool slide mount and the motor to linearly move the milling tool slide mount and the milling tool relative to the body.

7. The milling tool apparatus of claim 6, wherein the body and the base include mating alignment elements aligning the motorized milling head at the acute angle relative to the end face of the slot.

8. The milling tool apparatus of claim 1, wherein the base includes:
    a clamp positioning member for positioning the clamp; and a mount for operatively coupling the motorized linear actuator to the base, the mount defining the acute angle of the motorized linear actuator relative to the end face of the slot.

9. The milling tool apparatus of claim 8, wherein the mount is further configured to position the motorized linear actuator at a second acute angle relative to an axis of a turbomachine including the rotor and at a third acute angle relative to the axis of the turbomachine.

10. The milling tool apparatus of claim 9, wherein the first acute angle is approximately 47° to 49°.

11. The milling tool apparatus of claim 1, wherein the clamp further includes an adjustable fastener to allow selective securing and removal of the clamp in the selected mounting slot of the plurality of slots of the rotor.

12. The milling tool apparatus of claim 1, wherein the rotor is positioned in-situ within a turbomachine during use of the milling tool.

13. A milling tool apparatus for a slot of a rotor, the tool comprising:
   a base including a clamp configured to mount in a selected mounting slot of a plurality of slots of the rotor, each slot including an end face and a cooling slot flange extending from a root corner of the slot;
   a milling tool including a motorized milling head; and
   a motorized linear actuator coupling the milling tool to the base,
   wherein the base mounts the motorized linear actuator at an acute angle relative to the root corner of the slot to allow the motorized linear actuator to linearly move the milling tool to machine the root corner of the slot,
   wherein the clamp is configured to hold the base in position relative to the selected mounting slot.

14. The milling tool apparatus of claim 13, wherein the base and the linear actuator include at least one handle.

15. The milling tool apparatus of claim 13, further comprising an automated control system for controlling operation of the motorized milling head and the motorized linear actuator.

16. The milling tool apparatus of claim 15, wherein the automated control system includes a handheld controller operatively coupled to the milling tool and the motorized linear actuator.

17. The milling tool apparatus of claim 16, wherein the handheld controller includes a touchscreen.

18. The milling tool apparatus of claim 13, wherein the motorized linear actuator includes:
   a body;
   a motor coupled to the body;
   a milling tool slide mount slidably coupling the milling tool to the body; and
   a ball screw operatively coupled to the milling tool slide mount and the motor to linearly move the milling tool slide mount and the milling tool relative to the body.

19. The milling tool apparatus of claim 18, wherein the body and the base include mating alignment elements aligning the motorized milling head at the acute angle relative to the end face of the slot.

20. The milling tool apparatus of claim 13, wherein the base includes:
   a clamp positioning member for positioning the clamp; and
   a mount for operatively coupling the motorized linear actuator to the base, the mount defining the acute angle of the motorized linear actuator relative to the end face of the slot, and
   wherein the mount is further configured to position the motorized linear actuator at a second acute angle relative to an axis of a turbomachine including the rotor and at a third acute angle relative to the axis of the turbomachine.

21. The milling tool apparatus of claim 13, wherein the clamp further includes an adjustable fastener to allow selective securing and removal of the clamp in the selected mounting slot of the plurality of slots of the rotor.

22. The milling tool apparatus of claim 13, wherein the rotor is positioned in-situ within a turbomachine during use of the milling tool.

* * * * *